(12) United States Patent
Lee

(10) Patent No.: US 6,519,802 B2
(45) Date of Patent: Feb. 18, 2003

(54) ACTIVE WIPER SYSTEM FOR AN AUTOMOBILE

(75) Inventor: Jeong-Hoon Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/971,571

(22) Filed: Oct. 9, 2001

(65) Prior Publication Data

US 2002/0078522 A1 Jun. 27, 2002

(30) Foreign Application Priority Data

Dec. 23, 2000 (KR) .......................... 2000-81225

(51) Int. Cl.[7] .............................. B60S 1/34; B60S 1/44; B60S 1/06
(52) U.S. Cl. ............................. 15/250.19; 15/250.12; 15/250.202
(58) Field of Search .................. 15/250.19, 250.3, 15/250.31, 250.34, 250.13, 250.21, 250.202

(56) References Cited

U.S. PATENT DOCUMENTS

| 1,077,402 | A | * | 11/1913 | Ford | 15/250.19 |
| 1,610,361 | A | * | 12/1926 | Colvin | 15/250.19 |
| 3,224,026 | A | * | 12/1965 | Trzebinski | 15/250.19 |
| 3,604,048 | A | * | 9/1971 | Mainka | 15/250.19 |

FOREIGN PATENT DOCUMENTS

JP 0201741 * 12/1982 ................. 15/250.3

* cited by examiner

Primary Examiner—Gary K. Graham
(74) Attorney, Agent, or Firm—Birch, Stewart, Kolasch & Birch, LLP

(57) ABSTRACT

The present invention relates to a wiper system for an automobile and more particularly, to an active wiper system which secures a good front visual range by changing the track of the wiper blade of a passenger's side and positioning pertinently the wiper blade in each range of the track, thus preventing rainwater wiped by the wiper blade of a passenger's side from dropping down to the front of a driver's side while driving in the rain.

5 Claims, 4 Drawing Sheets

ACTIVE WIPER SYSTEM FOR AN AUTOMOBILE

FIELD OF THE INVENTION

The present invention relates to a wiper system for an automobile and more particularly, to an active wiper system which secures a good front visual range by changing the track of the wiper blade of a passenger's side and positioning pertinently the wiper blade in each range of the track, thus preventing rainwater wiped by the wiper blade of a passenger's side from dropping down to the front of a driver's side while driving in the rain.

BACKGROUND OF THE INVENTION

Generally, the conventional wiper system used for wiping off rainwater on the windshield glass in order to ensure visibility of a driver is defective in that the rainwater wiped by the wiper blade of a passenger's side drops down at a time onto windshield glass of a driver. Thus, the visibility of a driver is considerably restricted as shown in FIG. 1. Especially, while driving in a heavy rain, such a conventional wiper system puts a driver in danger due to limited visibility.

SUMMARY OF THE INVENTION

Accordingly, in order to be free from the above-mentioned problem occurring in the conventional wiper system, an object of the present invention is to provide the active wiper system for an automobile which secures a good front visual range by changing the track of the wiper blade of a passenger's side and positioning pertinently the wiper blade in each range of the track, thus preventing rainwater wiped by the wiper blade of a passenger's side from dropping down to the front of a driver's side while driving in the rain.

BRIEF DESCRIPTION OF THE DRAWINGS

FIGS. 4a–4b are sectional views showing the operation of an active wiper system in accordance with the present invention wherein FIG. 4a is a sectional view of the active wiper system just before the wiper blade is reversed to move up pivotally; and FIG. 4b is a sectional view of the active wiper system just before the wiper blade is reversed to move down pivotally.

DETAILED DESCRIPTION OF THE PREFERRED EMBODIMENTS

Figure 1:
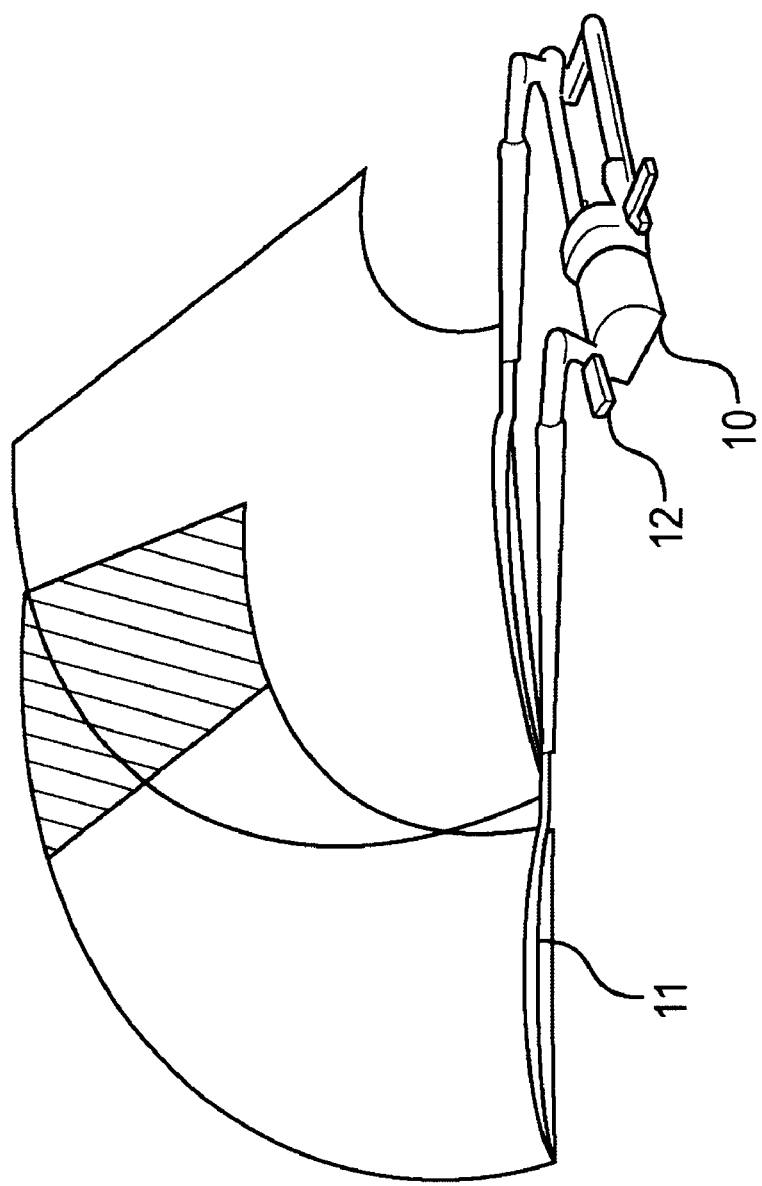
FIG. 1 is a schematic view of a general wiper system.

The present invention is described in detail with reference to the accompanying drawings as set forth hereunder.

The active wiper system of the present invention comprises a pivot shaft 14, a link member 18, a slider 20, and a rail 21.

The present invention is characterized in that (i) the pivot shaft 14 capable of moving vertically with elastic supporting of spring 13 is inserted into a body member 12 and connected with the lower end of wiper arm/blade 11 of a passenger's side; (ii) the linkage 18 is connected perpendicularly to the shaft 14 at the lower end of the shaft 14 and supported by the stopper 16 which is fixed on a wiper rod 15; (iii) the slider 20 is sliding between an opening 19 disposed in the link member 18 so as to move whole part of the link member 18 vertically; and (iv) the rail 21 leads the movement of the slider 20.

The present invention is also characterized in that the slider 20 comprises a stay 22 disposed in the opening 19 of the link member 18 and a roller 25 which is installed at the lower end of the stay 22 and rolls on the rail 21.

The present invention is further characterized in that the rail 21 on which the guide groove 24 is formed has a rising curvilinear section at the rear portion of the rail 21.

The present invention is further characterized in that the stopper 16 has a ball-connection with the wiper rod 15 by means of the ball fixed to the lower end of the stopper 16.

The present invention is further characterized in that the stay 22 is elastically supported by two stay springs 23 which are mounted at both ends of the stay 22.

The present invention is described in more detail hereinafter.

Figure 2:
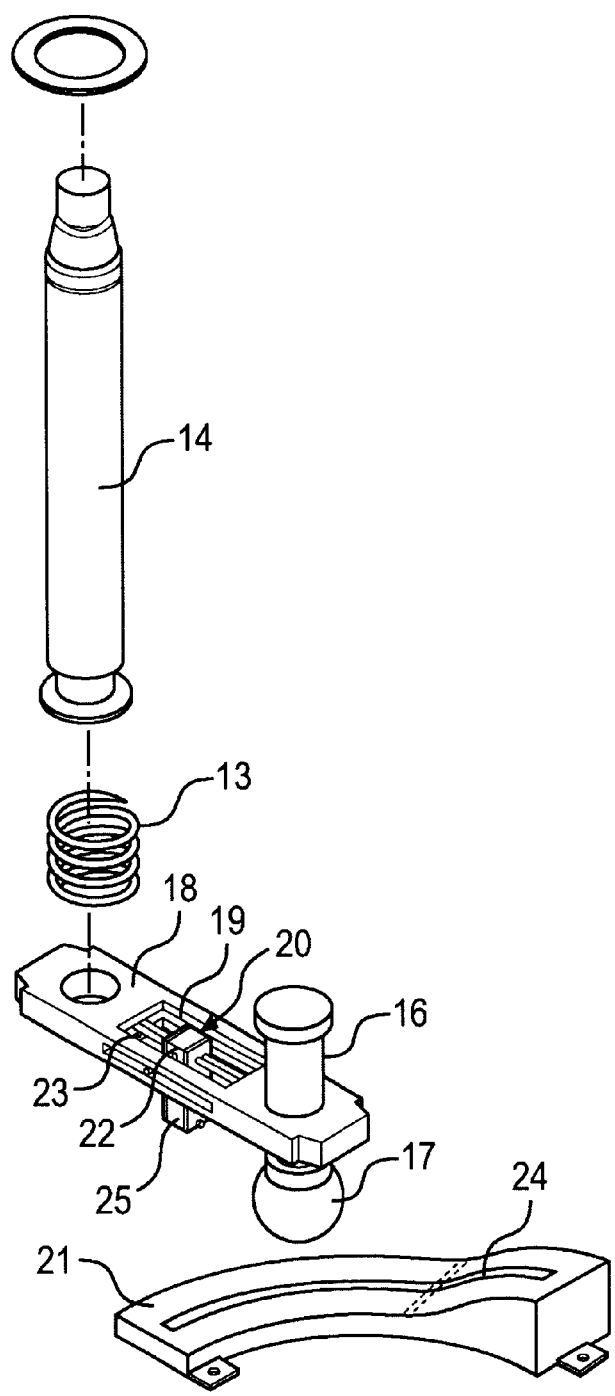
FIG. 2 is an exploded view showing the components of the active wiper system in accordance with the present invention.
Figure 3:
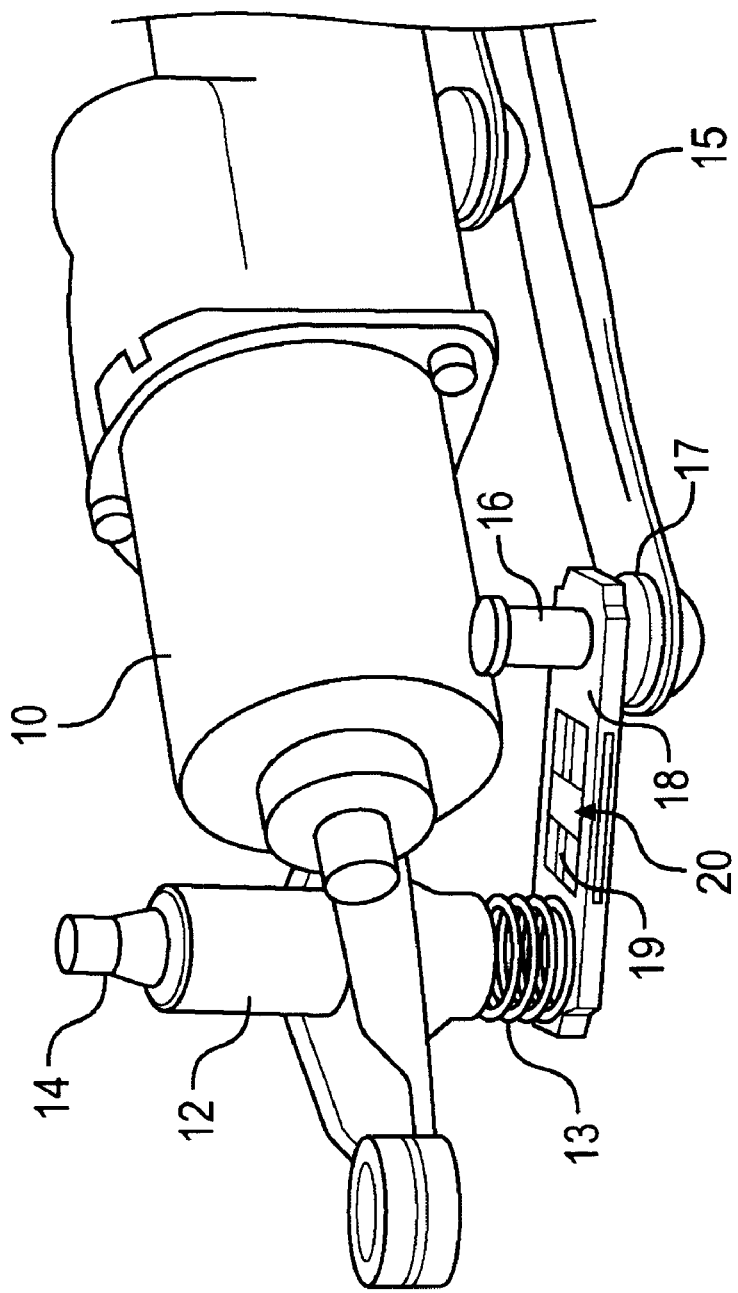
FIG. 3 is a perspective view of the active wiper system in accordance with the present invention.

FIG. 2 represents an exploded view showing the components of the active wiper system in accordance with the present invention and FIG. 3 represents a perspective view of the active wiper system.

The shaft is designated as reference numeral 14.

As shown in FIGS. 2 and 3, the shaft 14 is inserted into the body member 12, wherein the upper end of the shaft 14 is integrally connected to the lower end of the wiper are/blade 11 and the lower end is perpendicularly integrated with the link member 18, thus the shaft 14 moves with the wiper arm/blade 11 in the upward and downward directions depending on the movement of the link member 18. In particular, the restoring force of a rod spring 13 mounted between the linkage 18 and the shaft 14 allows the shaft 14 to return to its original position.

The link member is designated as reference numeral 18.

The link member 18 as a power-transmitting member includes the opening 19 in the middle of the link member 18, of which one end is perpendicularly integrated with the lower portion of the shaft 14 and the other end is connected on the wiper rod 15 by a means of the stopper 16. The link member 18 moves vertically by the movement of the slider 21 mounted in the opening 19 in the middle of the link member 18, thus allowing up-and-down movement of the wiper arm/blade 11 including the shaft 14. The stopper 16 accepts sufficiently all the movements of the link member 18 by using the ball 17 mounted under the stopper 16.

The slider is designated as reference numeral 20.

The slider 20 consists of the stay 22 which is disposed in the opening 19 of the link member 18 and the roller 25 which is installed at the lower end of the stay 22, wherein the stay 22 is supported for elastic movement by two stay springs 23 mounted at both ends of the stay 22.

The rail is designated as reference numeral 21.

The rail 21 for guiding the roller 25 is fixed on the wiper rod 15. The guide groove 24 is formed on the rail 21 with rapid rising curvilinear section at the rear portion. As the roller 25 rides along with the rising curvilinear section of the rail 21, the link member 18 and the shaft 14 begin to simultaneously rise. Therefore, the wiper arm/blade 11 can be detached from the windshield glass. In addition, it is preferred that the length of the rising curvilinear section should not exceed one third of full length of the rail 21.

The operational effect of the active wiper system in accordance with the present invention will be delineated in detail as follows.

Figure 4A:
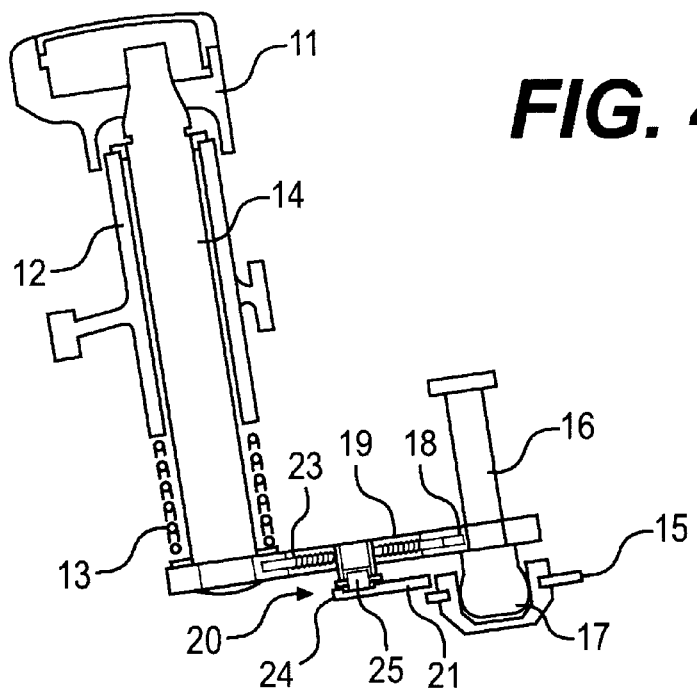
Figure 4B:
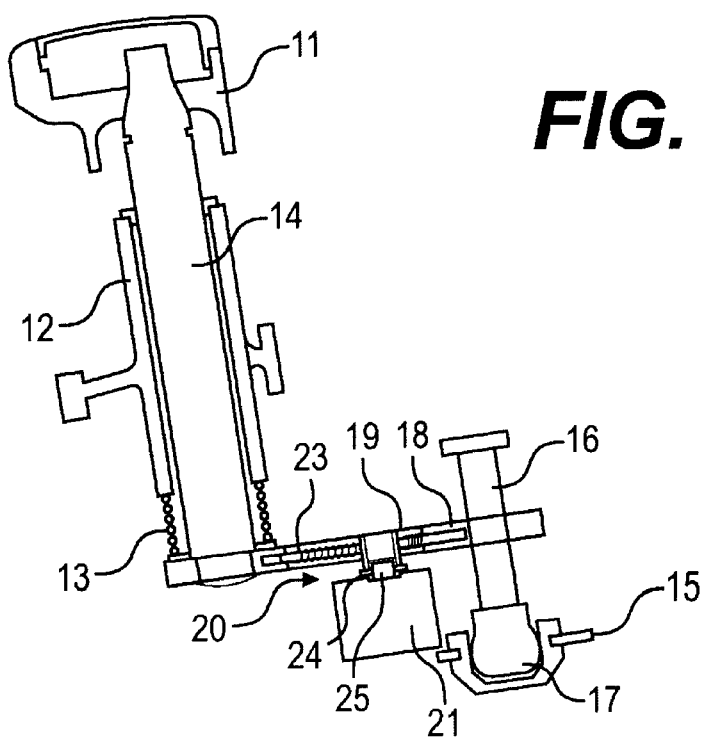

FIG. 4a is a sectional view showing the operation of the active wiper system just before the wiper arm/blade 11 moves. In this stage, the wiper arm/blade 11 and the shaft 14 are placed at the normal position where the wiper are/blade 11 is attached closer to the windshield glass surface due to the elastic force of the rod spring 13 and the roller 25 of the slide 20 is also on the flat section of the rail 21.

When the roller 25 of the slider 20 in the link member 18 rolls along with the guide groove 24 of the rail 21 from the beginning portion to two third of the rail 21, the wiper arm/blade 11 can wipe off rainwater on the surface of the windshield glass because the roller 25 is on the flat section of the rail 21. On the other hand when the roller 25 starts to move up to the rising curvilinear section of the rail 21, the wiper arm/blade 11 is detached from the windshield glass.

That is, when the roller 25 of the slider 20 starts to move along with the end portion of the guide groove 24 where is the rising curvilinear portion, the wiper arm/blade 11 is also moving as detached from the windshield glass. Therefore, the rainwater wiped falls down before it reaches the front of a driver's side. This active wiper system, thus, provides the large and good visual range for the driver while driving in the rain.

Reversely, the wiper arm/blade 11 begins its descent to downside with dectached form when the roller 25 rolls down the rising curvilinear portion of the rail 21. Thereafter, since the roller 25 rolls down the flat portion, it finishes its descent with closely attached form, resulting in clear and wide visual range for the driver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An active wiper system for an automobile, said system comprising:

a passenger side wiper and a driver side wiper, said wipers being driven by a wiper drive to sweep a windshield;

said wiper drive including;

a pivot shaft pivotally mounted in a body member and slidably moveable upwardly and downwardly therein, said pivot shaft is integrally connected at an upper end thereof with said passenger side wiper and is biased downwardly in the body member by a pivot shaft spring;

a link member is connected perpendicularly to a lower end of said pivot shaft and has a stopper member thereon which is coupled with a link rod;

a slider is slidable coupled in an opening within said link member;

a contoured rail is provided and adapted to be coupled with the automobile and is engageable by said slider during wiper drive actuation such that said slider can engage said rail to move said link member, pivot shaft and attached passenger side wiper vertically during a portion of the sweep.

2. The active wiper system according to claim 1, wherein said slider comprises a stay disposed in the opening of the link member and a roller which is installed at a lower end of the stay and rolls on the rail.

3. The active wiper system according to claim 1 or claim 2, wherein said rail includes a guide groove having a rising curvilinear section at a rear portion of the rail.

4. The active wiper system according to claim 2, wherein said stay is elastically supported by two stay springs at two ends of the stay.

5. The active wiper system according to claim 1, wherein said stopper has a ball-connection with the wiper rod by means of a ball fixed to the lower end of the stopper.

* * * * *